United States Patent [19]
Engelking

[11] Patent Number: 5,873,585
[45] Date of Patent: Feb. 23, 1999

[54] SELF-LEVELLING WAFER-LOT CART

[75] Inventor: Steven Engelking, San Antonio, Tex.

[73] Assignees: Sony Corporation, Japan; Sony Electronics, Inc., Park Ridge, N.J.

[21] Appl. No.: 783,239

[22] Filed: Jan. 14, 1997

[51] Int. Cl.⁶ .................................................. B62B 3/10
[52] U.S. Cl. .................... 280/47.35; 280/79.2; 280/79.3; 114/195; 248/188.3
[58] Field of Search .................. 114/195; 248/188.3, 248/364, 123.2; 280/79.3, 47.35, 47.34, 79.11, 79.2

[56] References Cited

U.S. PATENT DOCUMENTS

| | | | |
|---|---|---|---|
| 843,371 | 2/1907 | Simpson | 114/195 |
| 1,118,725 | 11/1914 | Bagaasen | 114/195 |
| 1,150,769 | 8/1915 | Klena | 114/195 |
| 1,192,070 | 7/1916 | Kerkhof | 114/195 |
| 1,623,427 | 4/1927 | Manrock | 114/195 |
| 5,394,589 | 3/1995 | Braeger et al. | 16/44 |
| 5,489,106 | 2/1996 | Engelking et al. | 280/47.35 |
| 5,615,902 | 4/1997 | Reurich | 280/47.19 |

FOREIGN PATENT DOCUMENTS 6-48302  2/1994  Japan ..................... 280/79.2

*Primary Examiner*—Peter C. English
*Assistant Examiner*—Avraham H. Lerner
*Attorney, Agent, or Firm*—Ronald P. Kananen

[57] ABSTRACT

In order to transport delicate equipment, unstable/hazardous liquids or the like, from one point to another, a cart, or similar form of conveyance, is provided with one or more tables or platforms which are pivotally supported and connected to a relatively large mass. The mass exhibits sufficient inertia that changes in cart orientation, as the cart traverses inclines or the effects of sudden cart accelerations or decelerations are compensated for by the inertial-controlled pivotal movement of the table.

17 Claims, 3 Drawing Sheets

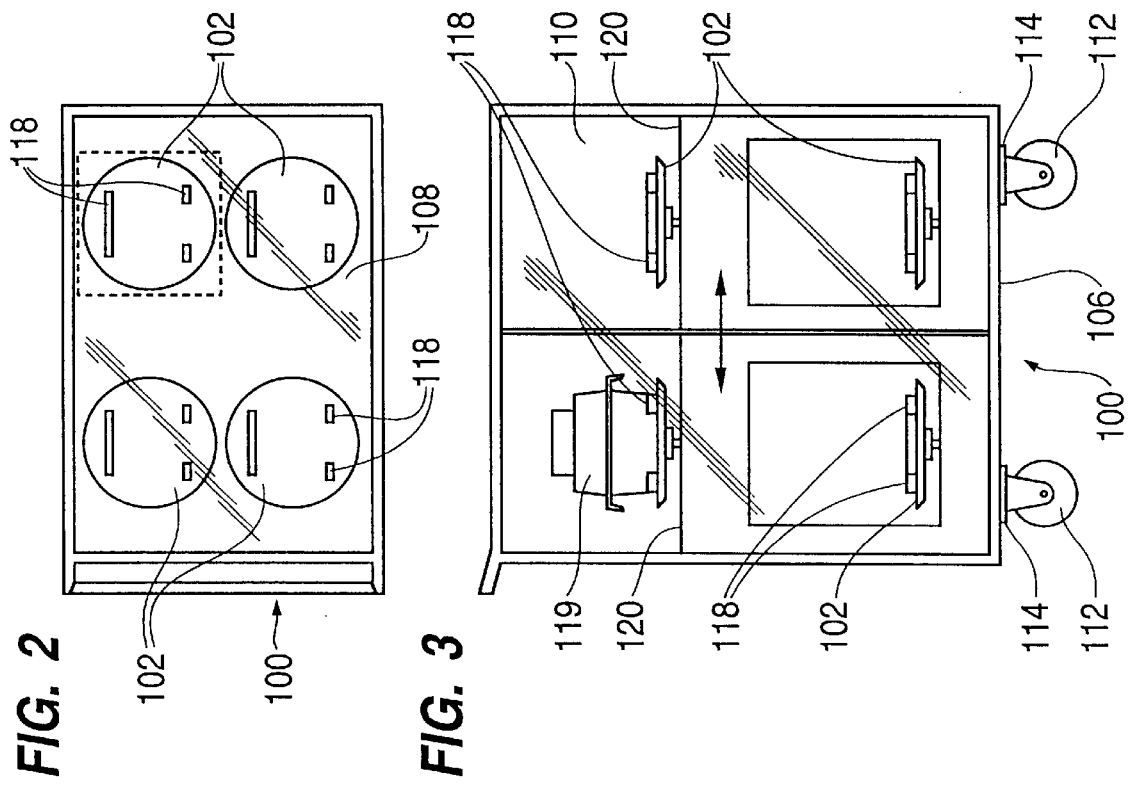
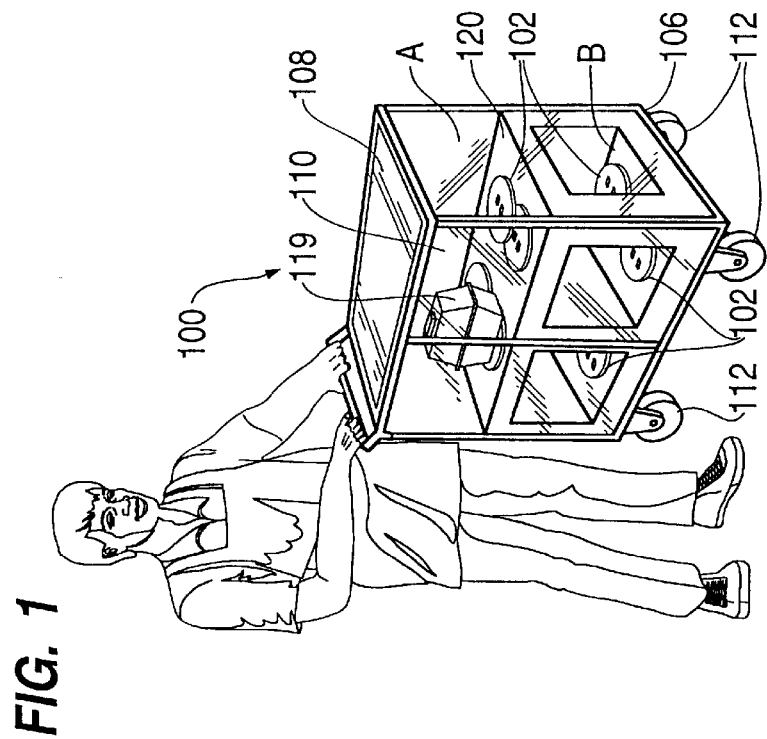

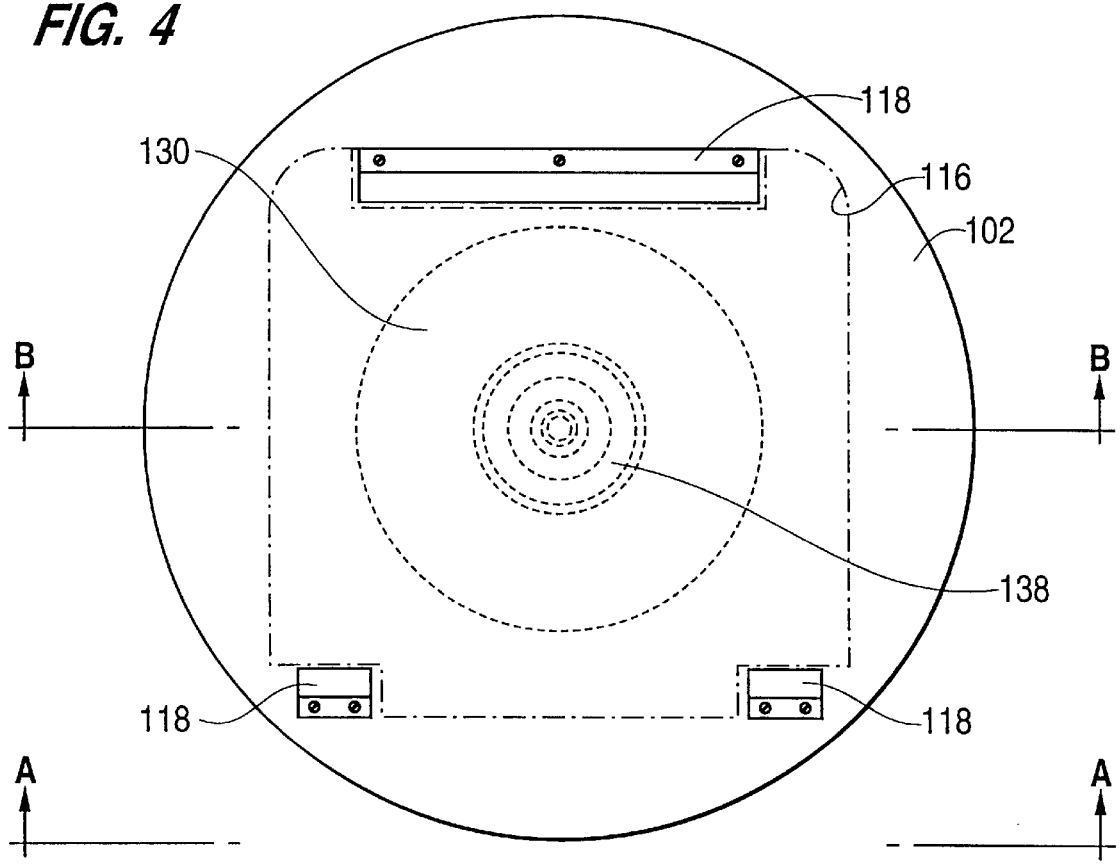
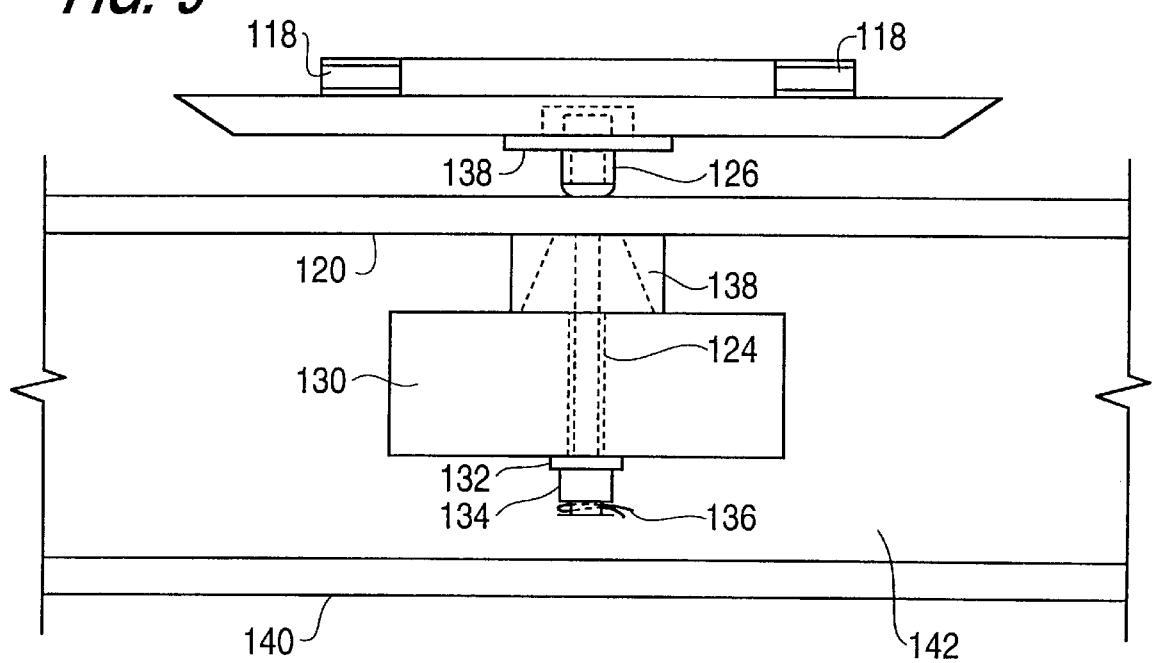

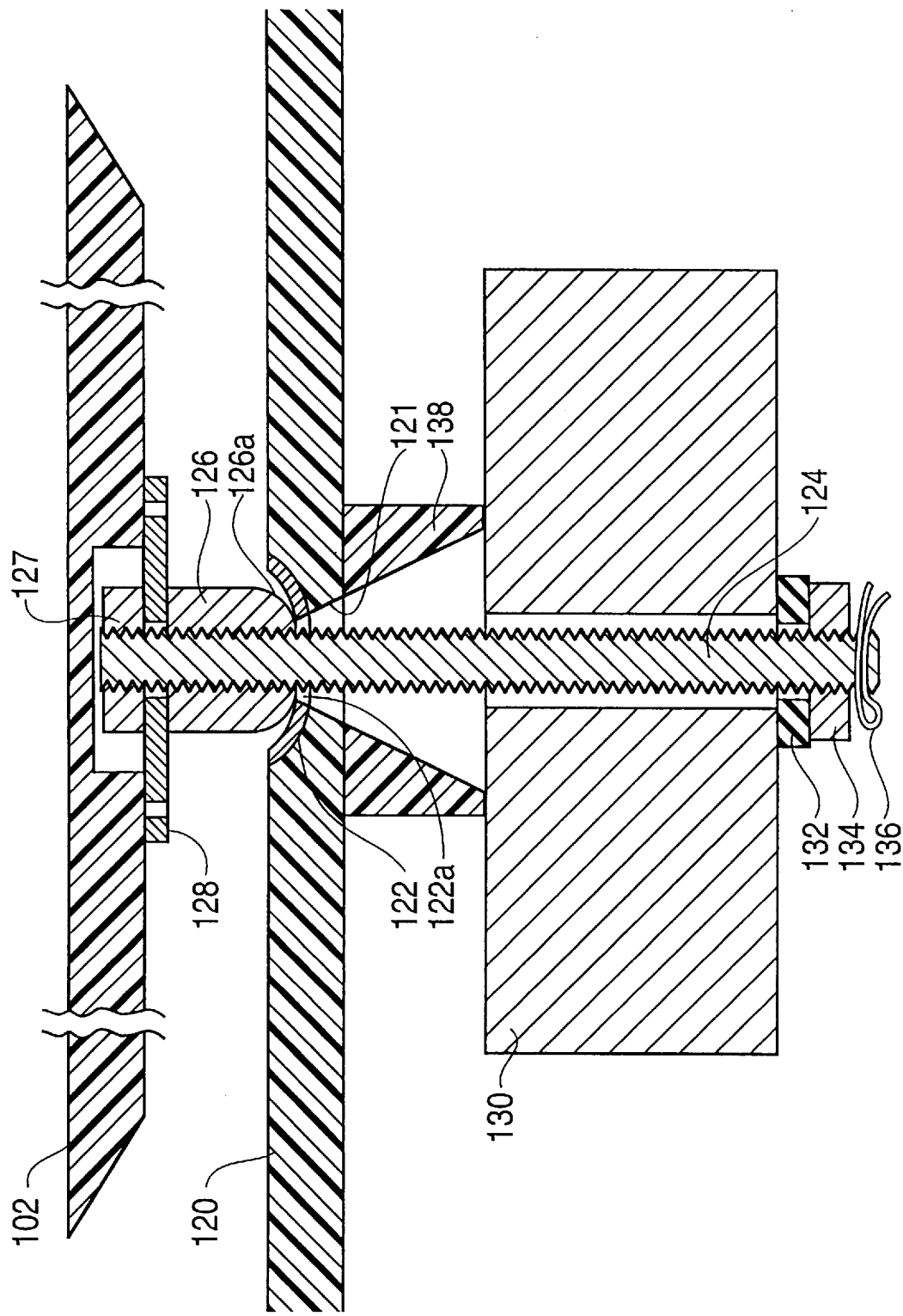

SELF-LEVELLING WAFER-LOT CART

BACKGROUND OF THE INVENTION

1. Field of the Invention

The present invention relates generally to a vehicle for transporting goods, articles or the like. More specifically, the present invention relates to a cart having inertia-levelled tables for transporting articles such as silicon wafers from place to place in a production environment.

2. Description of the Related Art

Silicon wafers on which integrated circuits are formed are very delicate and are usually transported in grooved cassettes which are in turn disposed in so-called wafer-lot boxes. A wafer-lot box supports a cassette, each of which can hold up to 25 wafers, in a manner wherein the cassette assumes an angle with respect to the horizontal and so that wafers are induced to rest on their respective rear surfaces and so that their front or upper surfaces do not come into contact with anything.

At certain phases of production, the wafers need to be transported to other areas irrespective of the fact that they may not yet be provided with their final protective coating. At such times, the dies on wafer are very vulnerable to impact damage and particle contamination. In the event that such wafers are loaded onto a hand cart, the chances of the wafers being jolted in a detrimental manner, such as when the cart is moved over expansion joint covers, or moved up or down an incline such as a ramp, and the like, exists, and therefore an operator, who is pushing the cart, must exercise extreme care in order to avoid any damage to the highly sensitive cart cargo.

SUMMARY OF THE INVENTION

It is therefore an object of the present invention to provide a cart which can be used to transport wafer-lot boxes or the like and which dramatically mitigates the effect of sudden stops, rapid acceleration, vertical impact such as tends to occur when the cart moves over an expansion joint cover and the like in a work place.

It is a further object of the present invention to provide a cart which is able to maintain the orientation of the wafer-lot boxes essentially constant even when the cart is moved from an essentially horizontal surface onto an inclined surface such as a ramp or the like.

In brief, the above and other objects are achieved by an arrangement wherein, in order to transport delicate equipment, unstable/hazardous liquids, and so forth, from one point to another, a cart, or similar form of conveyance, is provided with one or more tables or platforms which are pivotally supported and connected to a relatively large mass. The mass exhibits sufficient inertia that changes in cart orientation, as the cart traverses inclines or the effects of sudden cart accelerations or decelerations are compensated for by the inertial-controlled pivotal movement of the table.

More specifically, a first aspect of the present invention resides in a self-levelling table or platform arrangement for a conveyance, comprising: a shaft connected at its upper end to the table or platform; means defining a fulcrum about which the shaft can pivot; a mass connected to a lower portion of the shaft; and damping means for attenuating pivoting motion of the shaft about the fulcrum defined by the fulcrum defining means.

A second aspect of the present invention resides in a cart which features a table; a shaft; a mass connected to the shaft; means for pivotally supporting the shaft on a structure of the cart so that the mass tends to maintain the shaft vertical irrespective of the orientation of the cart; and damper means for attenuating pendulum like motion of the shaft about the pivotally supporting means.

BRIEF DESCRIPTION OF THE DRAWINGS

The various features and advantages of the present invention will become apparent as a description of the preferred embodiment is given with reference to the appended drawings in which:

FIG. 1 is a perspective view showing an embodiment of a cart according to the present invention;

FIG. 2 is a plan view of the cart shown in FIG. 1;

FIG. 3 is a side view of the cart shown in FIGS. 1 and 2;

FIG. 4 is plan view of a lot box support table arrangement which characterizes the present invention;

FIG. 5 is a side view of the table as seen along section line A—A of FIG. 4; and FIG. 6 is a sectional view of the table shown in FIG. 5 showing constructional details of the arrangement which enables self-levelling of the table, as taken along section line B—B of FIG. 4.

DETAILED DESCRIPTION OF THE PREFERRED EMBODIMENT

FIGS. 1 to 3 show a cart 100 which is equipped with a plurality of self-levelling suspended tables 102 in accordance with the present invention. In this embodiment of the invention, the cart 100 is provided with eight (8) tables 102 which are arranged in upper and lower compartments A, B. That is, four tables are arranged in the upper compartment A while the remaining four are arranged in the lower compartment B. The cart frame and major structural components 106 are, in this particular embodiment, constructed of polypropylene. The top and sides of the cart 100 are enclosed with transparent panels (either glass or plexiglass) 108, 110 which hermetically seal off the interior of the cart from external influences such as dust and the like. The side panels or doors 110 on the lateral sides of the cart are arranged to slide in the manner indicated by the double head arrow in FIG. 3.

In this embodiment, the cart 100 is supported on four casters-type wheels 112 which are each provided with either pneumatic tires or have wheels which are made of a suitably soft vibration transmission attenuating material. Each of the wheels is connected to the frame of the chassis of the cart 100 by way of elastomeric bushes or pads 114 which further attenuate any vibration that might tend to be transmitted to the contents of the cart.

Each of the tables 102 which are provided in this embodiment are constructed in the manner depicted in FIGS. 4 to 6. As will be appreciated from FIG. 4, the top of the table 102 is circular or disc-shaped, and in this embodiment, is formed of polypropylene. FIG. 4 also shows an imprint 116 which is formed in the upper surface of the table 102, and in which to lot box will sit. Three lot box mounts 118 are fastened to the upper surface of the disc in the illustrated positions. These mounts 118 engage with lower surfaces of the lot boxes 119 (see FIGS. 1 and 3) to ensure the correct location and orientation of the boxes during transportation.

As particularly clear from FIG. 6, the construction of each table 102 is such that the upper partition wall 120, which becomes the "floor" of each table level, includes an aperture 121 in which a hemi-spherical concave cup 122 is seated. This hemi-spherical cup 122 is formed with a concentric aperture 122a through which a threaded shaft 124 extends. The upper end of this shaft 124 has a hexagonal nut 126 secured thereto. The lower end of the nut 126 is formed with a domed portion 126a which is adapted to cooperate with the hemi-spherical concavity of the concave cup 122 in a manner that allows a rolling action to occur therebetween. A hex-nut 127 is provided to clamp a metal washer 128 against the top of nut 126 which is secured to the lower surface of the disc-shaped table 102 by suitable fastening means such as screws (not shown).

A large mass 130, in the form of a metal weight, made of steel or lead for example, is disposed on the lower end of the shaft 124 and maintained in place by a rubber washer or resilient cushion 132, a hexagonal nut (hex nut) 134, and a cotter pin 136. An annular-shaped spongy silicon elastomer oscillation damper 138 is provided about the shaft 124 between the upper surface of the mass 130 and the lower surface of the upper partition wall 120. In this embodiment, this oscillation damper 138 includes an annular member (annulus) in which a frusto-conically shaped opening is formed. The frusto-conically shaped opening is, in the illustrated arrangement, formed so as to be essentially co-extensive with a frusto-conical portion of the aperture 121 formed in the partition wall 120.

With this construction, by suitably tightening the hex nut 134, the arrangement can be induced to assume the condition illustrated in FIG. 6, wherein, if the cart 100, as it is being moved, is stopped abruptly, the masses 130 tends to keep moving and thus induce the situation wherein the table 102 tends to incline in a direction opposite to the momentum of the lot-boxes 119 which are supported on the tables 102. As will be readily appreciated, each table construction, including the shaft 124 and weight 130, is not unlike that of a complex pendulum. In order to address the problem of an un acceptably slow decrease in oscillatory movement, which would otherwise tend to occur once the arrangement was set in motion, the spongy silicon annulus 138 provides a damping action which attenuates such motion. Silicon annulus 138 also provides vertical jolt attenuation such as when the cart goes over an expansion joint on the floor. In this instance, the oscillation damper and the rubber washer 132 cooperate to resist vertical oscillation in an axial manner. That is, the annular member resists jolting.

When the cart 100 is pushed up or down an incline, the mass 130 will respond to gravity and thus tend to maintain the shaft 124 in a true vertical orientation irrespective of the tilting of the cart proper as it traverses the incline. Thus, when the cart 100 is being moved up or down an incline, the tables 102 in the cart will be maintained essentially horizontal and thus maintain the preferred inclination of the wafers in the cassettes.

The construction of the cart further includes a bottom cover or panel 140 which is made of polypropylene and which defines a space 142 between it and the upper partition wall, in which the relatively unsightly mass 130 and lower portion of the shaft 124 can be concealed and separated from the compartments of the cart 100 in which the tables 102 per se are located. Space 142 will also contain particle contamination derived from materials below the fulcrum.

Although the present invention has been described with reference to only a single embodiment, it will be clear to those skilled in the art to which the present invention pertains that the invention is not limited to the transport of lot boxes and may be readily applied to the transport of shock sensitive substances (e.g. nitroglycerine) wherein spillage or physical disturbance can be of concern and wherein the self-levelling features of the tables 102 is of advantage. In order to increase the arrangements resistance to vertical acceleration and to take advantage of the inertia of the mass 130, it could be envisaged to add additional resilient members which would allow the partition wall 120 to suddenly move upwardly with respect to the mass 130 and the table 102. That is, it may be possible, depending on the weight of article to be placed on the table 102, to place a resilient member under the hemi-spherical concave cup 122 or the like type of position. The shape and the weight (mass) of the mass 130 can be varied in accordance with the weight of the container or arrangement that is to be supported on the table. The length of the threaded shaft 124 can be varied to allow the mass 130 to be supported at a greater or lesser distance from the fulcrum point defined by the surfaces of the hemi-spherical concave cup 122 and the nut 126 which are in rolling contact with one another. This variable allows the moment which is applied to the table to be adjusted in addition to simply varying the weight of the mass 130. It may also be necessary to change the size of the annular-shaped spongy silicon elastomer oscillation damper 138 with the change in distance of the mass 130 from the fulcrum point and/or the actual size or shape of the mass 130.

The use of the self-levelling table is not limited to the use in carts and could be applied to conveyor belts or the like type of conveyances which are subject to jerky stop start operation or are inclined with respect to the horizontal.

What is claimed is:

1. A cart for transporting semiconductor wafers or volatile materials while automatically maintaining a level surface on which said transported articles are disposed, said cart comprising:

at least one table, and for each said table;
  a shaft one end of which is attached to said table;
  a mass connected to the shaft; and
  a joint in a structure of said cart which movably supports said shaft such that said table moves in response to the inertia of said mass so as to maintain an upper surface of said table in a level position;
  wherein said joint comprises a hole in said structure through which said shaft extends, said table being attached to said shaft above said structure and said mass being attached to said shaft below said structure.

2. A cart as claimed in claim 1, further comprising:
a plurality of pneumatic wheels;
a plurality of elastomeric vibration damping members each associated with wheel mounting means which operatively interconnect the pneumatic wheels with said cart by way of said plurality of elastomeric damping members.

3. A cart as claimed in claim 1, wherein said table comprises a disc-shaped member adapted to receive a wafer-lot box and to maintain the wafer-lot box in a predetermined orientation with respect to the direction of travel of the cart.

4. A cart as claimed in claim 1, further comprising cart walls for enclosing said at least one table in a manner to protect said at least one table from direct exposure to the ambient atmosphere.

5. A cart as claimed in claim 1, wherein said at least one table comprises a plurality of tables disposed on said cart.

6. A cart as claimed in claim 1, wherein said upper surface of said table comprises an impression which is sized to receive an item to be supported and maintained in a level attitude on said table.

7. A cart as claimed in claim 6, wherein said item to be supported is a wafer box and said impression further comprises box mounts for engaging said box to ensure a desired location and orientation of said box in said impression.

8. A cart as claimed in claim 1, further comprising a plurality of wheels for supporting said cart, said wheels being attached to pads which are in turn attached to a base of said cart, said pads reducing the transmission of vibrations from the wheels of said cart to said base.

9. A cart as claimed in claim 1, wherein said joint further comprises:

a concave indentation in said structure of said cart with a central opening formed therein through which said shaft passes; and a rounded member disposed on said shaft which pivotally engages said concave indentation.

10. A cart as claimed in claim 1, further comprising:

a plurality of pneumatic wheels;

a plurality of elastomeric vibration damping members each associated with wheel mounting means which operatively interconnect the pneumatic wheels with said cart by way of said plurality of elastomeric damping members.

11. A cart for transporting semiconductor wafers or volatile materials while automatically maintaining a level surface on which said transported articles are disposed, said cart comprising:

at least one table, and for each said table;
       a shaft one end of which is attached to said table;
       a mass connected to the shaft;
       a joint, in a structure of said cart, which movably supports said shaft such that said table moves in response to the inertia of said mass so as to maintain an upper surface of said table in a level position; and
       a damper for attenuating motion of said shaft at said joint;
    wherein said damper comprises a perforate block of elastomeric material which is disposed on said shaft between said mass and said joint and which resiliently resists movement of said mass with respect to the cart.

12. A cart as claimed in claim 11, further comprising cart walls for enclosing said at least one table in a manner to protect said at least one table from direct exposure to the ambient atmosphere.

13. A cart as claimed in claim 11, wherein said at least one table comprises a plurality of tables disposed on said cart.

14. A cart as claimed in claim 11, wherein said upper surface of said table comprises an impression which is sized to receive an item to be supported and maintained in a level attitude on said table.

15. A cart as claimed in claim 14, wherein said item to be supported is a wafer box and said impression further comprises box mounts for engaging said box to ensure a desired location and orientation of said box in said impression.

16. A cart as claimed in claim 11, further comprising a plurality of wheels for supporting said cart, said wheels being attached to pads which are in turn attached to a base of said cart, said pads reducing the transmission of vibrations from the wheels of said cart to said base.

17. A cart as claimed in claim 11, wherein said joint further comprises:

a concave indentation in said structure of said cart with a central opening formed therein through which said shaft passes; and a rounded member disposed on said shaft which pivotally engages said concave indentation.

* * * * *